(No Model.)

A. MECKY.
BICYCLE SADDLE.

No. 501,230. Patented July 11, 1893.

WITNESSES:
John W. Achard
E. Dibsdale

INVENTOR:
August Mecky
By Smith Weigand
ATT'Y.

UNITED STATES PATENT OFFICE.

AUGUST MECKY, OF PHILADELPHIA, PENNSYLVANIA.

BICYCLE-SADDLE.

SPECIFICATION forming part of Letters Patent No. 501,230, dated July 11, 1893.

Application filed March 18, 1893. Serial No. 466,603. (No model.)

*To all whom it may concern:*

Be it known that I, AUGUST MECKY, a citizen of the United States, residing at Philadelphia, in the county of Philadelphia and State of Pennsylvania, have invented certain new and useful Improvements in Seats or Saddles for Bicycles; and I do hereby declare the following to be a sufficiently full, clear, and exact description thereof as to enable others skilled in the art to make and use the said invention.

This invention relates to the seats or saddles of bicycles, and like vehicles, and has for its object the efficient straining or tightening of the seat upon its elastic support by simple and inexpensive mechanism.

To this end this invention consists of a special construction of clamping mechanism, combined with a recurved coiled spring by which, with the simple loosening of a nut, the lengthwise position of the spring in the clamp can be changed, and again securely fastened by tightening the nut.

The construction and operation of this invention are hereinafter fully described, and illustrated in the accompanying drawings.

Figure 1:
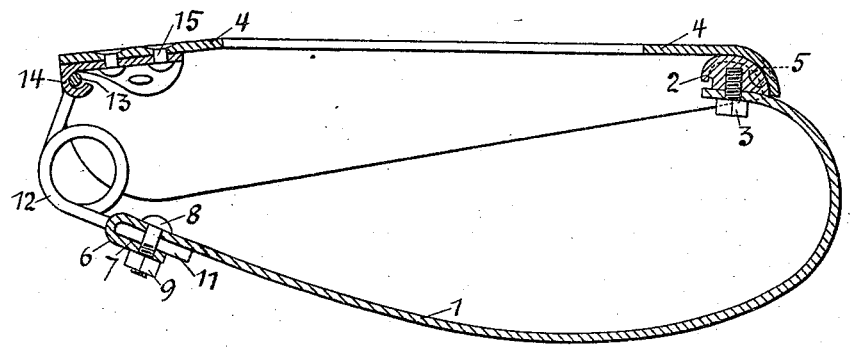
Figure 2:
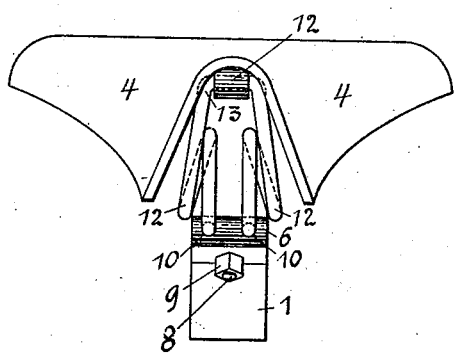

Referring to the drawings—Figure 1, shows a vertical lengthwise section of a bicycle saddle embodying this invention, and Fig. 2, a front view thereof.

1 represents a curved steel spring formed of a flat bar, bent as shown in the drawings.

2, is a cross piece of metal fastened by a bolt 3, passing through the rear end of the spring 1, and screwed into the cross piece 2. The cross piece 2, serves to support and laterally stretch the rear end of the leather seat 4, which is bent downwardly over the back and ends of it, and secured thereto by rivets 5. The forward end 6, of the spring 1, is bent under it so as to be in parallel position with the bar 1, with a space 7, left in the bend. A bolt 8, is fitted through perforation made in the plate 1, and the recurved end 6, and provided with a nut 9, whereby the parts 6, and 1, can be forced toward each other. Two perforations 10, are made in the front part of the bend of the spring bar 1, through which the ends 11 of a symmetrically coiled spring 12 are inserted; the upper part or loop 13 of the spring 12 engages in a hook 14, securely attached by rivets 15 to the front end of the seat leather 4; by loosening the nut 9, on the bolt 8, the ends 11 of the spring 12 may be adjusted in the direction of their length so as to obtain any desired tension upon the spring 12, and leather seat 4, and by again tightening the nut 9, the ends 11 are clamped in the space 7, and the adjustment retained.

Having described my invention, what I claim is—

In a bicycle saddle, the recurved coiled spring 12, having lengthwise adjustable free ends and means of attachment to the front end of the saddle seat, in combination with the clamp 6, formed on the end of the spring bar 1, by bending the end thereof back into parallel position with the bar, and perforating the bend for the insertion of the ends of the spring 12 and provided with a bolt and nut for compressing said clamp upon the ends of the spring 12, substantially as shown and described.

AUGUST MECKY.

Witnesses:
CYRUS R. MORGAN,
A. V. W. BUDD.